United States Patent
Adam et al.

(10) Patent No.: US 7,688,869 B2
(45) Date of Patent: Mar. 30, 2010

(54) SERIAL LINE CIRCUIT, AN APPARATUS IMPLEMENTED WITH A SERIAL LINE CIRCUIT, AND METHOD THEREOF

(75) Inventors: Joel F. Adam, Cupertino, CA (US); Jerry Martinson, San Jose, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 1806 days.

(21) Appl. No.: 10/782,612

(22) Filed: Feb. 19, 2004

(65) Prior Publication Data
US 2005/0185640 A1 Aug. 25, 2005

(51) Int. Cl.
*G02B 27/00* (2006.01)
*H02M 3/335* (2006.01)
*H04L 12/50* (2006.01)
*H04J 3/02* (2006.01)

(52) U.S. Cl. .................. 370/537; 250/551; 363/21.07; 363/21.12; 363/21.15; 370/366

(58) Field of Classification Search .............. 250/200, 250/551; 363/13, 15, 16, 20, 21.01, 21.04, 363/21.07, 21.12, 21.15; 370/366, 537–541
See application file for complete search history.

(56) References Cited

U.S. PATENT DOCUMENTS

| | | | | |
|---|---|---|---|---|
| 5,896,415 A | * | 4/1999 | Owens et al. | 375/224 |
| 6,408,034 B1 | * | 6/2002 | Krone et al. | 375/285 |
| 6,965,336 B2 | * | 11/2005 | Osborne | 341/155 |
| 2004/0228629 A1 | * | 11/2004 | Harris et al. | 398/79 |

* cited by examiner

*Primary Examiner*—Alford W Kindred
*Assistant Examiner*—Richard Franklin
(74) *Attorney, Agent, or Firm*—Blakely, Sokoloff, Taylor & Zafman LLP

(57) ABSTRACT

In one embodiment, the invention relates to a serial line circuit that comprises a serial information (SI) bus and at most two isolators interposed between a pair of programmable devices. In the TRANSMIT direction, a first programmable device is configured to multiplex serial data received from a plurality of serial UARTs and to route such data to the second programmable device over the SI bus and through a first isolator. In the RECEIVE direction, the second programmable device is configured to sample data from a plurality of serial interconnects and to route the sampled data to the first programmable device. The sampled data is routed over the SI bus and through a second isolator. The data transmission over the SI bus is in accordance with a proprietary serial transmission protocol described below.

14 Claims, 5 Drawing Sheets

SERIAL LINE CIRCUIT, AN APPARATUS IMPLEMENTED WITH A SERIAL LINE CIRCUIT, AND METHOD THEREOF

FIELD

Embodiments of the invention relate to the field of serial communications, in particular, to a serial line circuit.

GENERAL BACKGROUND

For decades, servers and other types of electronic devices have been implemented with input/output (I/O) devices. One type of I/O device is a serial port, which is normally a 9-pin or 25-pin connector positioned along a physically accessible portion of the electronic device. Since data is normally processed in parallel within an electronic device, the serial port is adapted to convert data from a parallel format into a serial format. A serial universal asynchronous receiver transmitter (hereinafter referred to as a "UART") normally performs this format conversion.

As shown in FIG. 1, a conventional multi-port serial line circuit 110 implemented within an electronic device is shown. The conventional serial line circuit 110 features a plurality of serial UARTs $120_1$-$120_8$ as well as corresponding dual channel opto-isolators $130_1$-$130_8$ and serial line drivers $140_1$-$140_8$.

As shown, each serial UART $120_1$, ..., or $120_8$ is configured to convert bytes received from internal circuitry of the electronic device into a serial bitstream. The serial bitstream is routed to corresponding serial line drivers $140_1$-$140_8$, which buffer incoming data, as needed, and drive the data onto a serial interconnect coupled thereto.

In order to provide voltage isolation, a single opto-isolator $130_1$, ..., or $130_8$ is positioned between a serial UART $120_1$-$120_8$ and its corresponding serial line driver $140_1$-$140_8$, respectively. An "opto-isolator" is a semiconductor device that allows signals to be transferred between circuits, but keeping those circuits electrically isolated from each other. This protects the circuitry from damage from electrical transients (e.g., electrical surges, ground potential differences, etc.).

Herein, each opto-isolator $130_1$, ..., or $130_8$ comprises a diode (e.g., light-emitting diode "LED", infrared-emitting diode "IRED" or laser diode) for signal transmission, and a photosensor for signal reception. The diode converts an electrical signal into a beam of visible, modulated light or infrared (IR). The beam crosses a transparent gap and is picked up by the photosensor. The photosensor converts the light beam or IR back into an output electrical signal. The output electrical signal is identical to the input electrical signal, although the input and output amplitudes may differ. Normally, the opto-isolator $130_1$, ..., or $130_8$ is enclosed in a single package appearing as an integrated circuit or a canned transistor with extra leads.

This architecture poses a number of disadvantages, especially for electronic devices having multiple serial ports. For instance, one disadvantage is that the total costs incurred in supporting multiple serial ports, such as a 24-serial port terminal server for example, is substantial. For instance, 24 opto-isolators generally cost around $54 in today's market. These costs normally prompt manufacturers to discontinue using such circuits and provide consumers with inferior electronic devices, or such costs are passed on to consumers.

Another disadvantage is that these opto-isolators occupy a substantial amount of real estate when mounted on a circuit board. Thus, any reduction in the number of requisite opto-isolators would free board area and enable smaller electronic devices.

Yet another disadvantage is that these opto-isolators require power at the electrically isolated side, which is expensive to supply. Thus, any reduction in the number of opto-isolators would provide useful power and cost savings.

BRIEF DESCRIPTION OF THE DRAWINGS

The invention may best be understood by referring to the following description and accompanying drawings that are used to illustrate embodiments of the invention.

DETAILED DESCRIPTION

Figure 1:
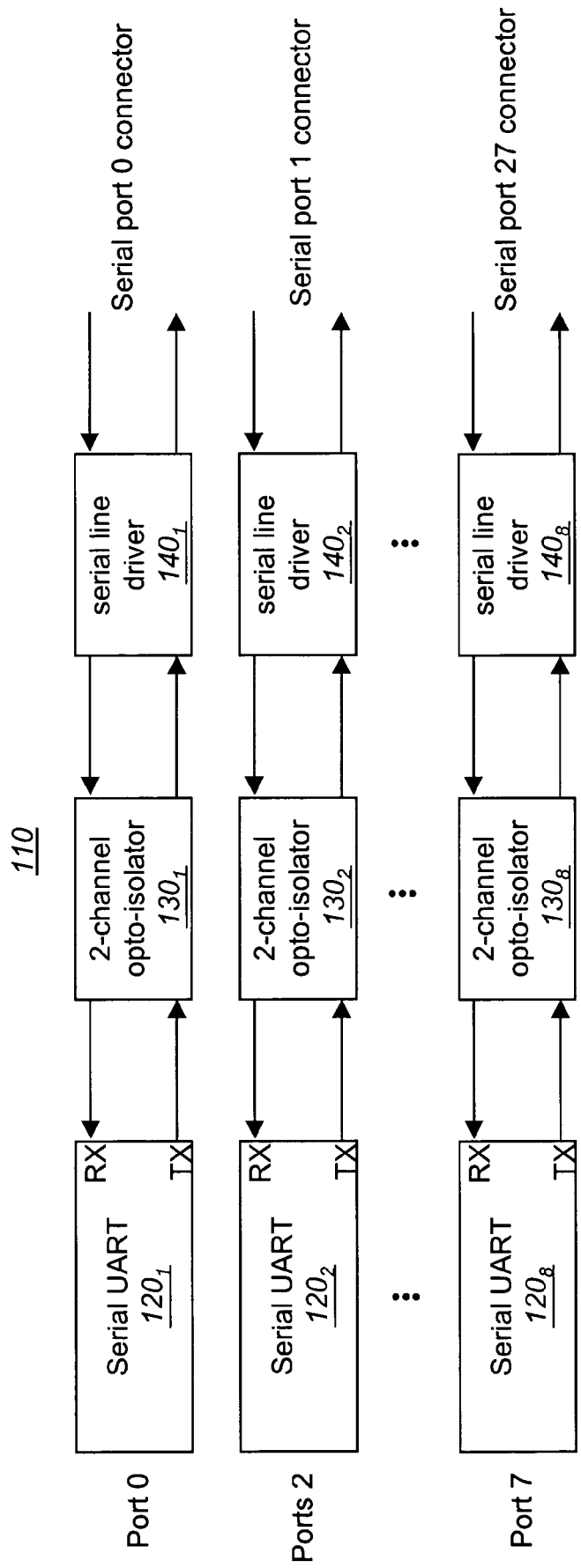
FIG. 1 illustrates a conventional serial line circuit employing dual channel opto-isolators for each serial port.

Herein, certain embodiments of the invention relate to a serial line circuit that comprises a serial information (SI) bus and at most two isolators interposed between a pair of programmable devices. In the TRANSMIT direction, a first programmable device is configured to multiplex serial data received from a plurality of serial UARTs and to route such data to the second programmable device over the SI bus and through a first isolator. In the RECEIVE direction, the second programmable device is configured to sample data from a plurality of serial interconnects and to route the sampled data to the first programmable device. The sampled data is routed over the SI bus and through a second isolator. The data transmission over the SI bus is in accordance with a proprietary serial transmission protocol described below.

Certain details are set forth below in order to provide a thorough understanding of various embodiments of the invention, albeit the invention may be practiced through many embodiments other that those illustrated. Well-known logic and operations are not set forth in detail in order to avoid unnecessarily obscuring this description.

In the following description, certain terminology is used to describe features of the invention. For example, an "electronic device" comprises components that process information transmitted over or received by one or more serial ports. Examples of an electronic device include, but are not limited or restricted to a server (e.g., terminal server), networking equipment (e.g., router, hub, etc.), integrated circuit(s) or the like.

A "component" may include hardware and/or software that is (are) configured to perform a certain function. The component is "programmable" when the function can be dynamically altered. Examples of a programmable component include a field programmable gate array (FPGA), a programmable logic device (e.g., complex PLD), a processor (e.g., microprocessor, digital signal processor, microcontroller), an application specific integrated circuit, a state machine or the like.

"Software" features executable code such as an operating system, an application, an applet, or even a routine. The software as well as data and other signaling may be stored in any appropriate storage medium such as a programmable electronic circuit, a semiconductor memory component, a volatile memory component (e.g., random access memory, etc.), a non-volatile memory component (e.g., read-only memory, flash memory, etc.), a floppy diskette, an optical disk such as a compact disk (CD) or digital versatile disc (DVD), a hard drive disk, or any type of interconnect (defined below).

An "interconnect" is generally defined as an information-carrying medium that establishes a communication pathway. Examples of such information-carrying medium include a physical medium such as one or more electrical wires, optical fibers, cables, bus traces, or similar materials. One type of interconnect is a serial interconnect, inclusive of one or more pathway enabling supporting serial data transmission.

Figure 2:
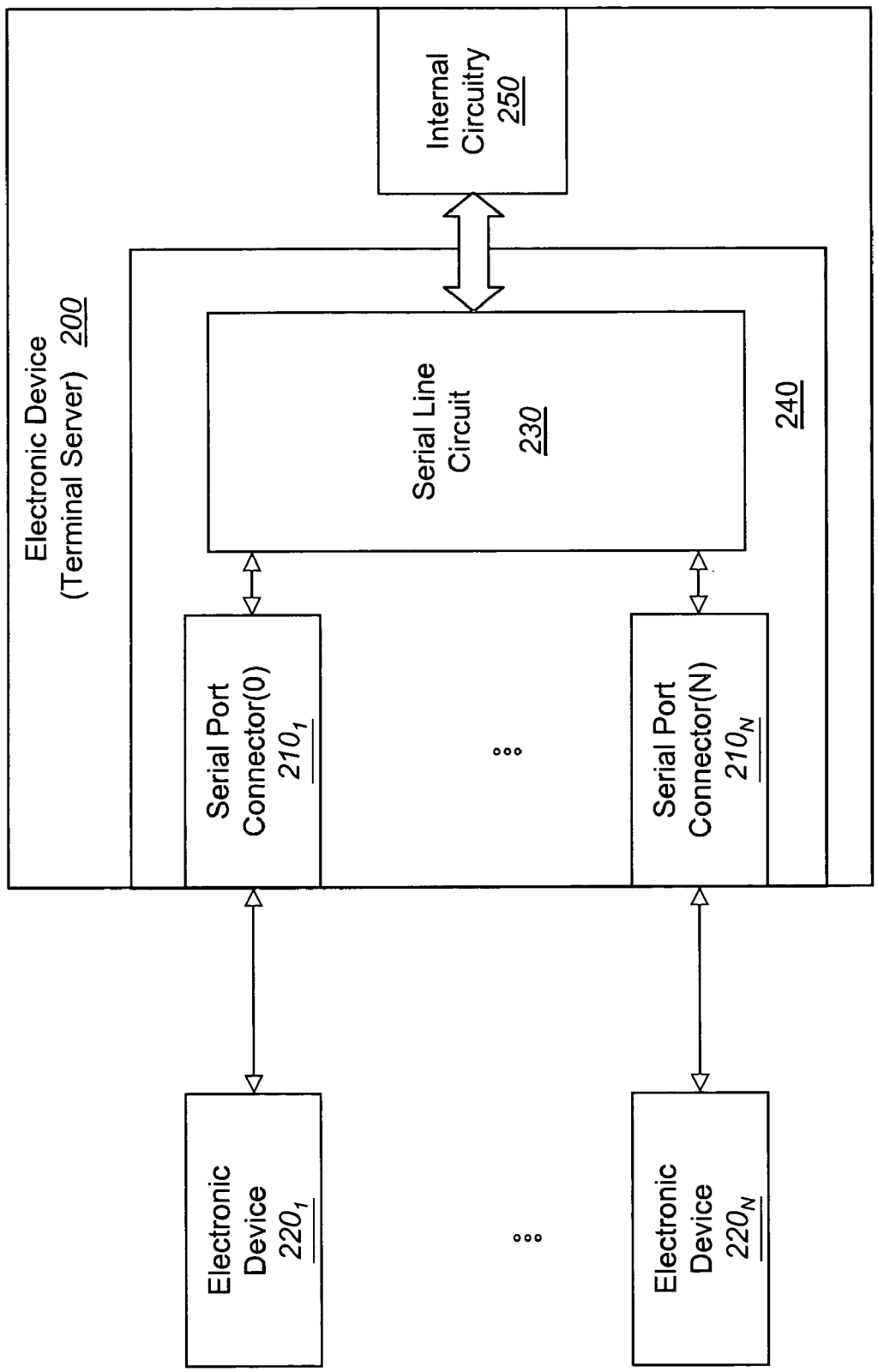
FIG. 2 is an exemplary embodiment of a network employing a terminal server implemented with a serial line circuit according to one embodiment of the invention.

Referring to FIG. 2, an exemplary embodiment of a network employing an electronic device 200 implemented with a serial line circuit is shown. For this embodiment of the invention, electronic device 200 is a terminal server configured with "N" serial port connectors $210_1$-$210_N$, where $N \geq 1$. These serial port connectors $210_1$-$210_N$ operate as an interface for serial communications between N electronic devices $210_1$-$210_N$ and a serial line circuit 230 implemented on a switch card 240. Serial line circuit 230 communications with internal circuitry 250 (e.g., processor) and serial port connectors $210_1$-$210_N$.

As shown in FIG. 2, switch card 240 may be implemented as a motherboard or perhaps a daughter card in communication with the motherboard. Examples of a "daughter card" include a network interface card (NIC), a modem card, or a video card.

Figure 3:
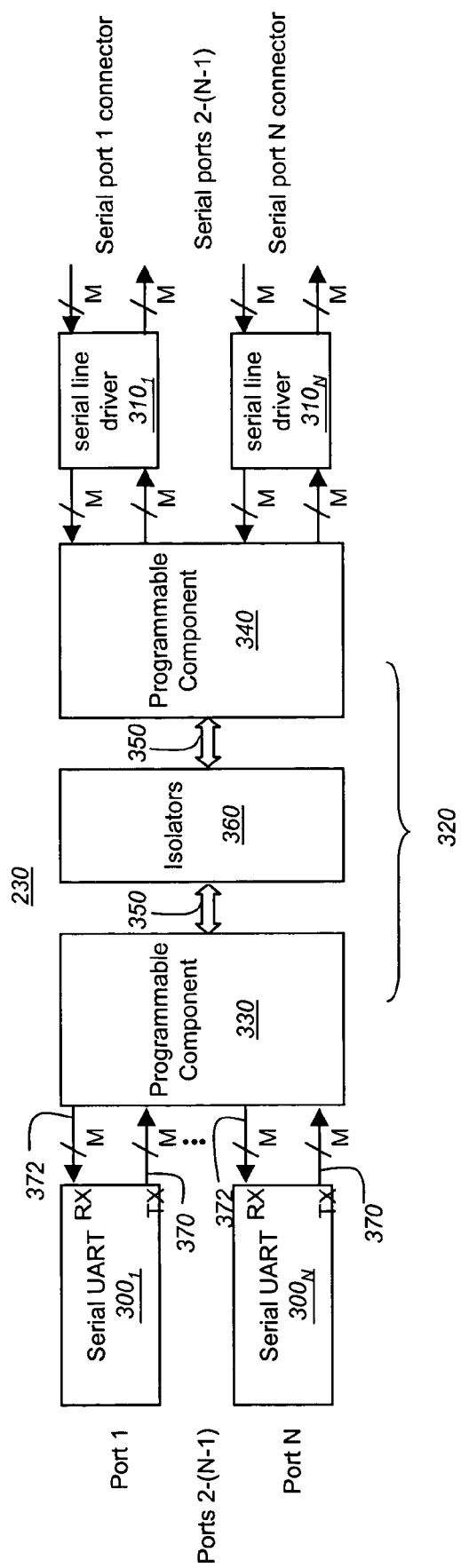
FIG. 3 is a first exemplary embodiment of the serial line circuit of FIG. 2.

Referring now to FIG. 3, a first exemplary embodiment of serial line circuit 230 of FIG. 2 is shown. For this embodiment of the invention, serial line circuit 230 comprises a plurality of serial UARTs $300_1$-$300_N$, a plurality of serial line drivers $301_1$-$301_N$, and an isolation circuit 320 coupled to both serial UARTs $300_1$-$300_N$ and serial line drivers $301_1$-$301_N$.

Herein, serial line drivers $301_1$-$301_N$ are coupled to one or more serial port connectors $210_1$-$210_N$ of FIG. 2. For instance, as shown, serial line driver $310_i$, where $1 \leq i \leq N$, is coupled to a corresponding serial port connector $210_i$. Of course, serial port connector $210_i$ may be a separate connector or part of a multi-pin connector (e.g., RJ-45 Ethernet jack). Although not shown, serial line drivers $301_1$-$301_N$ are configured to buffer incoming data from and drive data onto the serial interconnects coupled to serial port connectors $210_1$-$210_N$.

Serial UARTs $300_1$-$300_N$ are in communication with internal circuitry 250 of FIG. 2 and isolation circuit 320. For instance, a processor may be in communication with the serial UARTs $300_1$-$300_N$. Each serial UART $300_1$, ..., or $300_N$ is configured to transmit/receive both data and control information to/from isolation circuit 320 over interconnects 370 and 372, respectively. Interconnects 370 and 372 include "M" serial lines ($M \geq 1$) since some serial protocols support the transmission of data and control concurrently.

As further shown in FIG. 3, isolation circuit 320 comprises a pair of programmable components 330 and 340 interconnected by a serial information (SI) bus 350. SI bus 350 enables bi-directional communications between components 330 and 340 through a plurality of isolators 360, which are lesser in number than N×M. These isolators 360 may be single channel isolators or multi-channel isolators.

Figure 4:
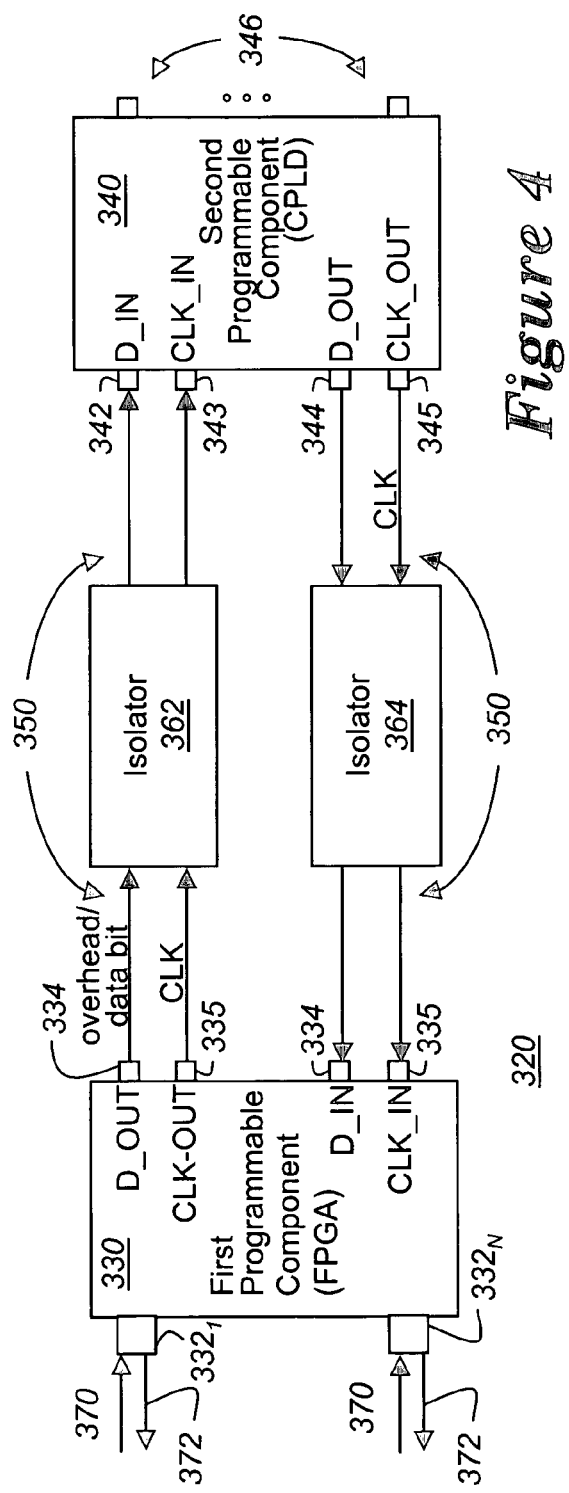
FIG. 4 is a first exemplary embodiment of a serial isolation circuit of FIG. 3.
Figure 5:
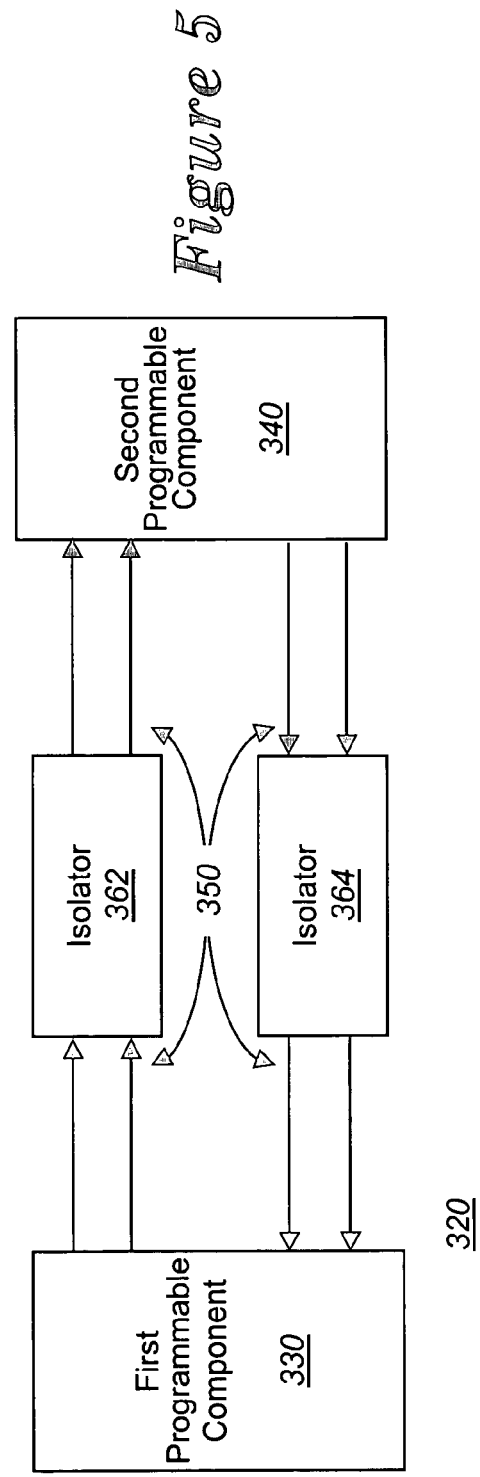
FIG. 5 is a second exemplary embodiment of serial isolation circuit of FIG. 3.

Referring to FIGS. 4 and 5, exemplary embodiments of isolation circuit 320 of FIG. 3 are shown. Herein, first programmable component 330 is adapted to support bidirectional communications with second programmable component 340 over SI bus 350 and a pair of dual-channel isolators 362 and 364. In general, SI bus 350 is configured in accordance with a transmission protocol that supports the transmission of data frames between first programmable component 330 and second programmable component 340. As an example, a data frame is a collection of bits transferred during a transition sequence, including control information preceding a serial data bit being transmitted. This control information comprises a serial port number used to identify the serial port from which the serial data originated and/or the serial port to which serial data is sent. The control information may further comprise a valid bit to identify whether the serial data bit is valid.

According to one embodiment of the invention, as shown in FIG. 4, dual-channel isolators 362 and 364 are giant magnetoresistive (GMR) effect isolators. In particular, each dual-channel isolator 362 and 364 comprises two GMR field sensitive resistor networks at the receive side separated from corresponding planar coils at the transmit side by a dielectric barrier (not shown). The dielectric barrier provides high-voltage isolation, where the amount of such isolation is based at least in part on the dielectric thickness and the material used. It is contemplated, however, that single channel GMR effect isolators (one resistor network, one planar coil) may be used as well as other types of isolators, provided these isolators can support transmission bandwidths of at least 16 megahertz (MHz) and perhaps 33 MHz or higher.

According to one embodiment of the invention, first programmable component 330 is a field programmable gate array (FPGA) while second programmable component 340 is a complex programmable logic device (CPLD). FPGA 330 comprises a plurality of input/outputs (I/O) ports $332_1$-$332_N$ adapted for coupling to corresponding serial UARTs $300_1$-$300_N$ (see FIG. 3). FPGA 330 further comprises a data output (D_OUT) 334, a clock output (CLK_OUT) 335, a data input (D_IN) 336, and a clock input (CLK_IN) 337.

CPLD 340 comprises a data input (D_IN) 342, a clock input (CLK_IN) 343, a data output (D_OUT) 344, and a clock output (CLK_OUT) 345. CPLD 340 further comprises serial I/O ports 346 for communication with serial line drivers $301_1$-$301_N$ of FIG. 3. Normally, CPLD 340 can support eight serial line drivers. Hence, three CPLDs would be needed to support a 24-serial port electronic device.

In the TRANSMIT direction, FPGA 330 generally operates as a multiplexer for routing serial data, received from serial UARTs $300_1$-$300_N$ of FIG. 3 via the I/O ports $332_1$-$332_N$, to the CPLD 340. The CPLD 340 operates as a demultiplexer. Since the serial bit rate over serial interconnects 370 (hereinafter referred to as the "serial line bit rate") is substantially less than the transmission rate of the SI bus 350, for each received serial data bit from serial UARTs $300_1$-$300_N$, FPGA 330 transmits both the received serial data bit and overhead through D_OUT 334 as described in FIG. 6.

According to one embodiment of the invention, the "overhead" may include a collection of bits that represent either (i) the serial port connector targeted to receive the serial data bit or (ii) the serial port connector from which the serial data bit was received. According to another embodiment of the invention, the overhead may further include a valid bit to indicate whether each bit frame carries valid or invalid information.

CLK_OUT 335 provides a clocking signal (CLK) setting a transmission frequency of SI bus 350. For instance, if the transmission frequency of SI bus 350 is set at 33 MHZ, CLK_OUT 335 provides the CLK signal oscillating at 33 MHz.

More specifically, the data is transmitted from D_OUT port 334 of FPGA 330 into first isolator 362. In addition, control information, such as the CLK signal for the SI bus 350 for example, is transmitted from CLK_OUT port 335 of FPGA 330 into first isolator 362.

According to one embodiment of the invention, the data (serial data bit and overhead) is routed to a first planar coil of first isolator 362, which generates magnetic fields that, once detected by a first GMR field sensitive resistor network, produces a representation of the serial data bit and overhead data bits. Of course, the signal amplitude of the representative serial data may differ from the original serial data. The representative serial data bit and overhead data bits are transferred over SI bus 350 into D_IN port 342 of CPLD 340.

Similarly, the CLK signal is transferred over a second planar coil of first isolator 362, causing a representation of the CLK signal to be produced and sent to CLK_IN port 343 of CPLD.

The CPLD 340 recovers the representative overhead data bits and determines a serial line driver $310_1, \ldots,$ or $301_N$ of FIG. 3 targeted to receive the representative serial data bit. The representative serial data bit is then transmitted from isolation circuit 320 to the targeted serial line driver via a selected I/O port 346.

In the RECEIVE direction, CPLD 340 generally samples serial data bits received on RX serial interconnects of a serial port connector via a corresponding serial line driver as shown in FIG. 3. The sampling rate is substantially greater than the serial line bit rate, such as thirty-two times faster for example (serial line bit rate is 9.6 Kbps; sampling rate is 307.2 KHz). Since the sampling rate is substantially greater than the serial line bit rate, CPLD 340 transmits both the sample bit along with overhead through D_OUT 344 as described in FIG. 6.

Herein, the data is transmitted from D_OUT port 344 of CPLD 340 into second isolator 364. In addition, control information, such as CLK signal for the SI bus 350 for example, is transmitted from CLK_OUT port 345 of CPLD 340 into second isolator 364. Second isolator 364 produces representative overhead bits and sampled data bit.

The FPGA 330 recovers the overhead data bits and determines a serial UART $300_1, \ldots,$ or $300_N$ targeted to receive the sampled data bit. The sampled data bit is then transmitted from isolation circuit 320 to the targeted serial UART.

Figure 6:
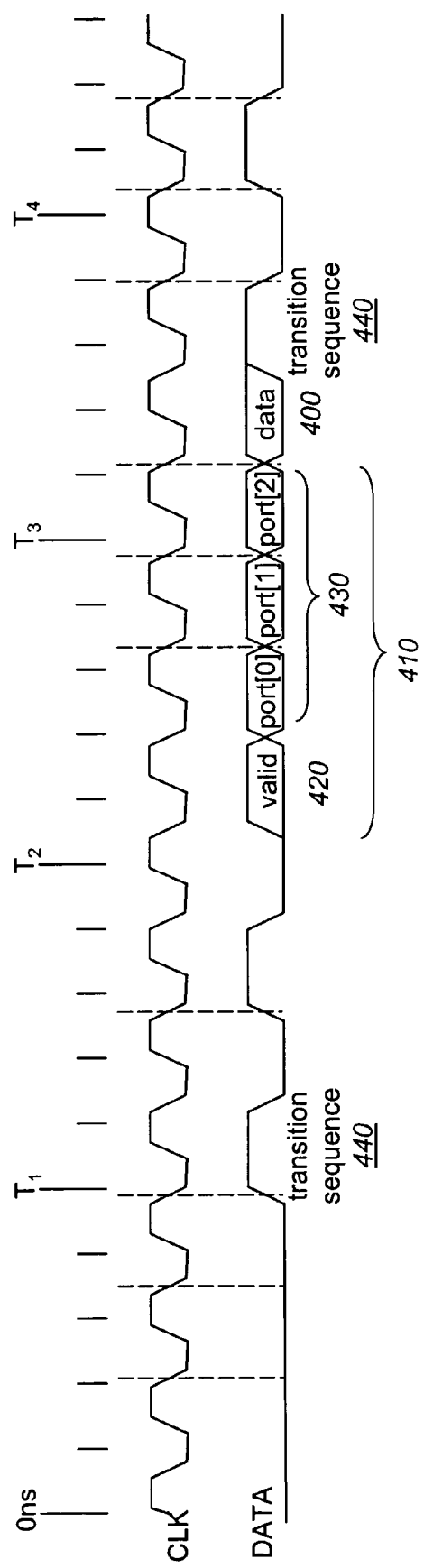
FIG. 6 is an exemplary embodiment of the serial information bus protocol.

Referring now to FIG. 6, an exemplary embodiment of the SI bus protocol is shown. In both the TRANSMIT and RECEIVE directions, the same proprietary protocol is used to transport incoming serial data over the SI bus. Each bit of serial data 400 is separately sent with control information 410. Control information 410 may include a valid bit 420 to indicate whether the serial data 400 is valid and a serial port number 430 (e.g., a collection of bits that identifies the serial port from which the serial data 400 originated). Herein, serial port number 430 is represented as a 3-bit value to identify 8 serial ports. However, serial port number 430 may be altered to be another bit value to identify N serial ports.

The serial data 400 and control information 410 is framed by a transition sequence 440, which is used to synchronize the exchange of information between the first programmable device and the second programmable device as shown in FIGS. 4 and 5.

While the invention has been described in terms of several embodiments, the invention should not be limited to only those embodiments described, but can be practiced with modification and alteration within the spirit and scope of the appended claims. The description is thus to be regarded as illustrative instead of limiting.

What is claimed is:

1. A serial line circuit comprising:
a bus;
a plurality of isolators interposed between two portions of the bus;
a first component coupled to the bus, the first component to transfer information via a first isolator of the plurality of isolators, the first component is a programmable component being a field programmable gate array (FPGA) to multiplex serial data and to transfer the serial data over the bus via the first isolator; and
a second component coupled to the bus, the second component to transfer sampled information over the bus via a second isolator of the plurality of isolators.

2. The serial line circuit of claim 1, wherein the second component is a programmable component being a complex programmable logic device (CPLD) that samples data from a plurality of serial connectors and routes the sampled data over the bus via the second isolator.

3. A serial line circuit comprising:
a bus;
a plurality of isolators interposed between two portions of the bus;
a first component coupled to the bus, the first component to transfer information via a first isolator of the plurality of isolators; and
a second component coupled to the bus, the second component to transfer sampled information over the bus via a second isolator of the plurality of isolators, the first component to receive serial data bits, multiplex the received serial data bits by forming data frames each including a plurality of overhead bits along with a serial bit of the received serial data bits, and to transfer the overhead bits along with the serial bit to the second component over the bus via the first isolator, the overhead bits including a serial port number to identify a serial line connector to receive the serial bit corresponding to the overhead bits.

4. The serial line circuit of claim 3, wherein the first component receives the serial data bits from a plurality of serial Universal Asynchronous Receiver Transmitters (UARTs).

5. The serial line circuit of claim 3, wherein the overhead bits include a valid bit to identify whether the serial bit is valid.

6. The serial line circuit of claim 3, wherein the second component to receive a first data frame and to transfer a serial bit of the first data frame to a serial line connector determined by the serial port number contained in the overhead bits.

7. An electronic device comprising:
a plurality of serial port connectors; and
a serial line circuit coupled to the plurality of serial port connectors, the serial line circuit comprises
a first programmable component,
a second programmable component in communication with the plurality of serial port connectors,
a bus coupled to the first programmable component and the second programmable component,
a first isolator situated along the bus, the first isolator to receive a serial data bit preceded by control information from the first programmable component for transfer to the second programmable component, and
a second isolator situated along the bus, the second isolator to receive a sampled data bit preceded by control information from the second programmable component for transfer to the first programmable component, wherein the first programmable component of the serial line circuit comprises a field programmable gate array (FPGA) to multiplex serial data received from a plurality of serial Universal Asynchronous Receiver Transmitters (UARTs) and to transfer at least the control information and the serial data bit of the serial data over the bus via the first isolator.

8. The electronic device of claim 7, wherein the second programmable component of the serial line circuit comprises a complex programmable logic device (CPLD) that samples data from the plurality of serial port connectors and routes the sampled data over the bus via the second isolator.

9. An electronic device comprising:
a plurality of serial port connectors; and
a serial line circuit coupled to the plurality of serial port connectors, the serial line circuit comprises
a first programmable component,
a second programmable component in communication with the plurality of serial port connectors,
a bus coupled to the first programmable component and the second programmable component,
a first isolator situated along the bus, the first isolator to receive a serial data bit preceded by control information from the first programmable component for transfer to the second programmable component, and
a second isolator situated along the bus, the second isolator to receive a sampled data bit preceded by control information from the second programmable component for transfer to the first programmable component,
wherein the first programmable component of the serial line circuit to receive serial data bits including the serial data bit, to multiplex the received serial data bits by forming data frames, one of the data frames including a serial port number along with the serial data bit, and to transfer the serial port number along with the serial data bit to the second programmable component over the bus via the first isolator.

10. The electronic device of claim 9, wherein the one of the data frames formed by the first programmable component further comprises a valid bit to identify whether the serial data bit is valid.

11. The electronic device of claim 9, wherein the second programmable component to receive one of the data frames and to transfer the serial data bit to a first serial port connector of the plurality of serial port connectors determined by the serial port number.

12. A method comprising:
receiving a plurality of serial data bits;
multiplexing the plurality of serial data bits in order to transfer the serial data bits over an interconnect through a single isolator, the multiplexing comprises generating control information for each serial data bit of the plurality of data bits and transferring the control information along with a corresponding serial data bit immediately after each other, and a transmission rate of the interconnect exceeds a transmission rate of at least one interconnect providing the corresponding serial data bit by a factor of at least one-hundred;
recovering each of the plurality of serial data bits; and
determining a serial port connector for each of the plurality of serial data bits for routing to the serial port connector.

13. The method of claim 12, wherein the control information comprises a serial port number.

14. The method of claim 13, wherein the control information further comprises a valid bit to identify whether the corresponding serial data bit is valid.

* * * * *